US011271265B2

(12) United States Patent
Elia et al.

(10) Patent No.: US 11,271,265 B2
(45) Date of Patent: Mar. 8, 2022

(54) LOW-POLARIZATION LITHIUM OXYGEN BATTERY

(71) Applicant: Bayerische Motoren Werke Aktiengesellschaft, Munich (DE)

(72) Inventors: Giuseppe Antonio Elia, Rome (IT); Jusef Hassoun, Latina (IT); Sangsik Jeong, Ulm (DE); Franziska Mueller, Goeppingen (DE); Stefano Passerini, Ulm (DE); Jakub Reiter, Munich (DE); Bruno Scrosati, Rome (IT); Yang-Kook Sun, Seoul (KR); Nikolaos Tsiouvaras, Munich (DE); Ulderico Ulissi, Ulm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 50 days.

(21) Appl. No.: 16/784,407

(22) Filed: Feb. 7, 2020

(65) Prior Publication Data

US 2020/0176839 A1 Jun. 4, 2020

Related U.S. Application Data

(63) Continuation of application No. PCT/EP2017/070375, filed on Aug. 10, 2017.

(51) Int. Cl.
| | | |
|---|---|---|
| *H01M 4/36* | (2006.01) | |
| *H01M 12/08* | (2006.01) | |
| *H01M 4/38* | (2006.01) | |
| *H01M 4/86* | (2006.01) | |
| *H01M 4/88* | (2006.01) | |
| *H01M 12/02* | (2006.01) | |
| *H01M 4/485* | (2010.01) | |
| *H01M 4/505* | (2010.01) | |
| *H01M 4/525* | (2010.01) | |
| *H01M 4/62* | (2006.01) | |
| *H01M 50/44* | (2021.01) | |
| *H01M 50/411* | (2021.01) | |
| *H01M 50/431* | (2021.01) | |
| *H01M 50/429* | (2021.01) | |
| *H01M 4/02* | (2006.01) | |

(52) U.S. Cl.
CPC ........... *H01M 12/08* (2013.01); *H01M 4/366* (2013.01); *H01M 4/382* (2013.01); *H01M 4/485* (2013.01); *H01M 4/505* (2013.01); *H01M 4/525* (2013.01); *H01M 4/625* (2013.01); *H01M 4/8673* (2013.01); *H01M 4/8807* (2013.01); *H01M 12/02* (2013.01); *H01M 50/411* (2021.01); *H01M 50/4295* (2021.01); *H01M 50/431* (2021.01); *H01M 50/44* (2021.01); *H01M 2004/027* (2013.01); *H01M 2004/8689* (2013.01); *H01M 2300/0025* (2013.01)

(58) Field of Classification Search
CPC .. H01M 12/08; H01M 12/02; H01M 50/4295; H01M 50/44; H01M 50/431; H01M 50/411; H01M 4/366; H01M 4/382; H01M 4/485; H01M 4/505; H01M 4/525; H01M 4/625; H01M 4/8673; H01M 4/8807; H01M 2004/027; H01M 2004/8689; H01M 2300/0025
See application file for complete search history.

(56) References Cited

U.S. PATENT DOCUMENTS

| 6,627,058 B1 * | 9/2003 | Chan ...................... C12Q 1/006 204/294 |
|---|---|---|
| 6,749,648 B1 | 6/2004 | Kumar et al. |
| 2015/0214541 A1 * | 7/2015 | Bresser ..................... C09C 1/04 429/220 |

FOREIGN PATENT DOCUMENTS

WO    WO 2014/023680 A1    2/2014

OTHER PUBLICATIONS

International Search Report (PCT/ISA/210) issued in PCT Application No. PCT/EP2017/070375 dated Sep. 13, 2017 (two (2) pages).
Written Opinion (PCT/ISA/237) issued in PCT Application No. PCT/EP2017/070375 dated Sep. 13, 2017 (seven (7) pages).
Elia et al., "Supporting Information An Advanced Lithium-Air Battery Exploiting an Ionic Liquid-based Electrolyte", Oct. 20, 2014, XP055404188, Retrieved from: http://pubs.acs.orq/doi/suppl/10.4021/nl6034985/suppl_file/nl5031985_si_001.pdf (seven (7) pages).
Takechi et al., "Decoupling Energy Storage From Electrochemical Reactions In Li-Air Batteries Toward Achieving Continuous Discharge", ACS Energy Letters, Feb. 14, 2017, pp. 694-699, vol. 2, (six (6) pages).
Zhang W-J., "A Review Of The Electrochemical Performance Of Alloy Anodes For Lithium-Ion Batteries", Journal of Power Sources, 2011, pp. 13-24, vol. 196, (12 pages).
Matsuda et al., "Improved Charging Performance Of Li—$O_2$ Batteries By Forming Ba-incorporated $Li_2O_2$ As The Discharge Product", Journal of Power Sources, 2017, pp. 138-143, vol. 353, (six (6) pages).
Matsuda et al., "Enhanced Energy Capacity Of Lithium-Oxygen Batteries With Ionic Liquid Electrolytes By Addition Of Ammonium Ions", Journal of Power Sources, 2017, pp. 12-17, vol. 356, (six (6) pages).

(Continued)

*Primary Examiner* — Raymond Alejandro
(74) *Attorney, Agent, or Firm* — Crowell & Moring LLP

(57) ABSTRACT

A lithium-air battery is provided, which includes a cathode having a gas diffusion layer containing a solid electronically conductive material coated with carbon black, the gas diffusion layer being at least partially filled with gaseous air, a separator having an electronically nonconducting filter material arranged between the anode and the cathode, the filter material being at least partially impregnated with a liquid electrolyte, and an anode containing a material selected from lithium metal, material alloyable with lithium, metal oxide, and mixtures thereof. Methods for making such battery and the use of such battery in a motor vehicle are also provided.

14 Claims, 6 Drawing Sheets

(56) References Cited

OTHER PUBLICATIONS

Elia et al., "An Advanced Lithium-Air Battery Exploiting An Ionic Liquid-Based Electrolyte", Nano Letters, Oct. 20, 2014, pp. 6572-6577, vol. 14, (six (6) pages).
Bresser et al., "Transition-Metal-Doped Zinc Oxide Nanoparticles As A New Lithium-Ion Anode Material", Chemistry of Materials, Dec. 4, 2013, pp. 4977-4985, vol. 25, (nine (9) pages).
Seo et al., "Influence of Ion Diffusivity And Gas Solubility In Ionic Liquids On Li-Air Battery Performance", ECS Transactions, 2016, pp. 147-160, vol. 75, No. 15, (14 pages).

* cited by examiner

Fig. 1d (Grey scale)

Fig. 1d (B/W)

LOW-POLARIZATION LITHIUM OXYGEN BATTERY

CROSS REFERENCE TO RELATED APPLICATION

This application is a continuation of PCT International Application No. PCT/EP2017/070375, filed Aug. 10, 2017, the entire disclosure of which is herein expressly incorporated by reference.

BACKGROUND AND SUMMARY OF THE INVENTION

The present invention relates to a lithium-air battery, a method for producing the same, and the use of the battery in a motor vehicle.

Lithium-oxygen ($Li-O_2$) or lithium-air batteries, as they are commonly called, are regarded as a technology with future potential. Theoretically, this technology provides similar specific energies and energy densities as gasoline. It appears therefore to be possible to drive electric vehicles up to a range of 550 km or more.

The fundamental principle of operation of all lithium-air batteries, despite the considerable differences in their structure, is based on the following: During the discharge, positively charged lithium ions are transferred from the negative electrode of lithium metal or alloy to the positive electrode via the electrolyte, where the lithium ions react with oxygen ($O_2$) first to lithium superoxide ($LiO_2$) and then to lithium peroxide ($Li_2O_2$). When the battery is charged, this process is reversed: oxygen ($O_2$) is released at the positive electrode, metallic lithium is deposited at the negative electrode, or a lithium alloy is formed.

Takechi K. et al., ACS Energy Lett. 2017, 2, 694-69, examines the possibility of decoupling the oxygen reduction reaction on cathode and formation and storage of lithium superoxide and lithium peroxide in the bulk electrolyte and thus avoids deposition of the electrolyte during battery discharging on the cathode. Lithium-air batteries comprising uncoated carbon paper cathodes and DEME-TFSI electrolyte without adding any lithium salt were studied with respect to their discharge profile, discharge products, and cathode changes during operation. As control, DEME-TFSI/LiTFSI containing electrolyte was used.

A problem to be solved is to provide a lithium-air battery with improved characteristics. A further object is to provide a method for its production and a use thereof.

These and other objects of the invention are achieved by the lithium-air battery in accordance with one or more aspects of the disclosure.

The following definitions apply, if applicable, to all aspects of the invention.

Battery

Battery refers to both rechargeable batteries (secondary batteries) as well as non-rechargeable batteries (primary batteries). In particular, a "battery" for the purposes of the present invention also includes a single or only "electrochemical cell." Preferably, two or more of such electrochemical cells are connected together in a "battery", either in series (i.e., successively) or in parallel.

Electrodes

The electrochemical cell according to the invention has at least two electrodes, i.e., a positive (cathode) and a negative (anode) electrode.

Both electrodes each have at least one active material. This is capable of absorbing or releasing lithium ions and at the same time absorbing or releasing electrons.

The term "positive electrode" means the electrode which, when the battery is connected to a load, for example to an electric motor, is capable of receiving electrons and lithium cations. It is the cathode in this nomenclature.

The term "negative electrode" means the electrode which, when the battery is connected to a load, for example to an electric motor, is capable of releasing electrons and lithium cations during operation. It represents the anode in this nomenclature.

The electrodes include inorganic material or inorganic compounds or substances which can be used for or in or on an electrode or as an electrode. These compounds or substances can, under the working conditions of the lithium-air battery, accept (insert) and also release lithium ions due to their chemical nature. In the present specification, such material is referred to as "active cathode material" or "active anode material" or generally as "active material." For use in an electrochemical cell or battery, this active material is preferably applied to a support or carrier, preferably to a metallic support, preferably aluminum for the cathode or copper for the anode. This support is also referred to as a "collector" or current collector or collector film.

Electrode Binders

The materials used for the positive or for the negative electrode, such as the active materials, may be held together by one or more binders which hold the particles of the material together and also helps to fix these materials on the electrode or on the current collector.

The binder (s) may be selected from the group consisting of polyvinylidene fluoride (PVdF), polyvinylidene fluoride-hexa-fluoro-propylene co-polymer (PVdF-HFP) polyethylene oxide (PEO), polytetrafluoroethylene, polyacrylate, styrene-butadiene Rubber, and carboxymethylcellulose (CMC), and mixtures and copolymers thereof. Styrene-butadiene rubber and optionally carboxymethylcellulose and/or the other binders such as PVdF are preferably present in an amount of 0.5-8% by weight based on the total amount of the active material used in the positive or negative electrode.

In a first aspect of the invention, there is provided a lithium-air battery containing a cathode, a separator and an anode, the separator separating the anode and the cathode from one another.

The cathode includes a gas diffusion layer, at least partially filled with gaseous air, which has or preferably consists of an electronically conductive material coated with carbon black.

The anode includes an active material selected from the group consisting of lithium metal, material alloyable with lithium, lithium metal oxide, metal oxide, and mixtures thereof.

The material alloyable with lithium may be a lithium alloy or a non-lithiated or partially lithiated precursor thereof, resulting in a lithium alloy formation. Preferred lithium-alloyable materials are lithium alloys selected from the group consisting of silicon-based, tin-based and antimony-based alloys. Such alloys are described, for example, in the review article W. J. Zhang, Journal of Power Sources 196 (2011) 13-24.

Lithium metal oxides may be selected from the group consisting of lithium titanium oxide, lithium cobalt oxide, and lithium nickel oxide, and mixtures thereof. Such compounds can be produced, for example, as described in U.S. Pat. No. 6,749,648 B1.

Metal oxides may be selected from the group consisting of cobalt oxide, nickel oxide, iron oxide, copper oxide, zinc oxide, transition metal zinc oxide, and mixtures thereof. Such metal oxides follow in principle as mechanism of lithium acceptance the so-called conversion reaction.

The separator is a filter which contains, or preferably consists of, an electronically non-conductive material. The filter is at least partially impregnated with an electrolyte.

The electrolyte includes, preferably consists of, N, N-diethyl-N-methyl-N-(2-methoxyethyl) ammonium bis(trifluoromethanesulfonyl) imide (DEME-TFSI) as the hydrophobic, ionic liquid and lithium bis (trifluoromethanesulfonyl) imide (LiTFSI) as the lithium salt. DEME-TFSI is an aliphatic quaternary ammonium-based ionic liquid, which has a flexible methoxy-ethyl group on the nitrogen atom combined with the bis (trifluoromethanesulfonyl) imide anion. The bulky, asymmetric organic cation is believed to prevent ions from packing and solidification, thus resulting in a liquid structure at room temperature (20° C.) and normal pressure (101,325 kPa). In addition, DEME-TFSI has a wide potential window and high ionic conductivity.

In the lithium-air battery according to the present invention, the three phases of gaseous air, liquid electrolyte and solid, electronically conductive material are in contact at at least one point, preferably at least one line, of the gas diffusion layer.

According to the present invention, the expression "at least partially filled gas diffusion layer with air" means that the gas diffusion layer can be partially filled with the electrolyte, in addition to air. According to the invention, the term "air" means any gas or gas mixture which is compatible with a lithium-air battery and which comprises at least oxygen. In particular, the term "air" includes pure oxygen and the air from the environment of the lithium-air battery. The expression "at least partially impregnated filter with an electrolyte" refers to a filter which can also be partially filled with air except for electrolytes.

The inventors have found that by combining the cathode comprising a gas diffusion layer, at least partially filled with gaseous air, which contains or preferably consists of an electronically conductive material coated with carbon black with the electrolyte LiTFSI/DEME-TFSI, a lithium air battery allowing a reversible discharge-charge with capacity of about 13 Ah g$^{-1}$ (related to amount of carbon black deposited on the cathode) and coulombic efficiency approaching 100% can be obtained. In addition, the oxygen reduction reaction (ORR)/oxygen evolution reaction (OER) is reversible. Furthermore, the cycling behavior of the lithium oxygen cell using the LiTFSI/DEME-TFSI solution from 30° C. to 60° C. evidences increased energy efficiency and originally changing morphology by temperature rise.

The above technical merits could not be obtained when the carbon coating was omitted or a different electrolyte, such as LiTFSI in N-butyl-N-methylpyrrolidinium bis (trifluoromethanesulfonyl) imide (Pyr$_{14}$TFSI), were used.

Without being bound to a theory, it is believed that the coating of the gas diffusion layer with black carbon provides catalytic sites for the electrochemical Li$_2$O$_2$-deposition process. In addition, the electrolyte LiTFSI/DEME-TFSI stabilizes the intermediate superoxide species. In summary, the coating of the gas diffusion layer with black carbon and the electrolyte LiTFSI/DEME-TFSI synergistically enhance the kinetic of the electrochemical lithium peroxide deposition process, influencing both reaction pathway and morphology of the formed products.

In a preferred embodiment, the gas diffusion layer includes woven or nonwoven carbon fiber fabric.

In a preferred embodiment, the gas diffusion layer is coated with carbon black having a specific surface area of 30 to 120 g/m$^2$, preferably 40 to 90 g/m$^2$, more preferably 50 to 80 g/m$^2$, in particular 55 to 70 g/m$^2$, as measured according to BET-nitrogen adsorption (ASTM D3037-89). This carbon black has a high conductivity. Preferably, the conductive carbon black is produced by the TIMCAL method. The process is based on the partial oxidation of oil from carbo- and petrochemical raw materials. The method is characterized by the observance of certain aerodynamic and thermodynamic conditions, in particular low oxidation speed and dispensing with quenching additives and other additives. This produces a material almost without residues of combustion on a sieve having a mesh number 325, which has a very high cleanliness.

Preferably, the conductive carbon black has a chain-like structure similar to acetylene black. For example, as the conductive carbon black having a small specific surface area, Super P® can be used.

In a preferred embodiment, the separator contains, preferably consists of, a material selected from the group consisting of glass fibers, cellulose fibers, organic polymer, and mixtures thereof. As the organic polymer, it is particularly preferable to use a polymer or copolymer comprising a polymerization unit selected from the group consisting of polyethylene, polypropylene and mixtures thereof.

In a preferred embodiment, the molar ratio of LiTFSI to DEME-TFSI is 1:2 to 1:20.

In a preferred embodiment, the anode contains carbon-coated particles of $M_xZn_{1-x}O$ wherein M is a transition metal selected from the group consisting of Fe, Co, Ni, Mn, and Cu, preferably Fe and Co, in particular Fe, and $0.02 \leq x \leq 0.14$. In the case of carbon-coated $M_xZn_{1-x}O$ particles, there is no need to use additional carbon for producing an electrode.

Advantageously, the carbon network of the carbon coating is able to provide sufficient electrical conductivity on the part of the electrode. Provision may be made, however, to add further carbon for producing an electrode. This allows the conductivity of the electrode to be increased further.

As active material, the carbon-coated $M_xZn_{1-x}O$ particles have superior safety characteristics compared with lithium metal. In addition, the carbon-coated $M_xZn_{1-x}O$ particles are notable for superior cycling stability in the electrodes produced from them, and significantly increased specific capacity and significantly reduced loss of capacity in the first cycle, relative to the use of zinc oxide. Moreover, electrodes based on the use of $M_xZn_{1-x}O$ particles, and more particularly those based on the use of carbon-coated $M_xZn_{1-x}O$ particles, as active material, exhibit a superior specific capacity for increasing applied current densities, which are higher by a factor of around three than those achievable when using ZnO.

In the $M_xZn_{1-x}O$ particles, x is between 0.02 and 0.14. Higher proportions of transition metal can lead to a phase transition of the doped zinc oxide particles in the course of calcining. The ratio of transition metal M to zinc may be preferably in the range from $x \geq 0.05$ to $\leq 0.13:1\_x$, more particularly 0.1:0.9. The transition metal M is preferably iron or cobalt, in particular iron. The ratio of transition metal M to zinc, more particularly of iron to zinc, may also be in the range from $x \geq 0.04$ to $\leq 0.13:1\_x$, preferably in the range from $x \geq 0.06$ to $\leq 0.12:1\_x$. Particularly preferred particles are carbon-coated $Co_{0.1}Zn_{0.9}O$ and $Fe_{0.1}Zn_{0.9}O$ particles. Further particularly preferred particles are carbon-coated $Co_{0.12}Zn_{0.88}O$ and $Fe_{0.12}Zn_{0.88}O$ particles. It has been found, for example, that in the range $0.02 \leq x \leq 0.12$, the iron fraction was advantageous for the achievable specific capacity and discharge rate. Overall, a transition metal fraction with these ranges, more particularly of 0.02≤x≤0.12 is advantageous for an electrode produced from this material.

The fraction of carbon, based on the total weight of the carbon-coated $M_xZn_{1-x}O$ particles, is preferably in the range from 0.5 wt % to ≤70 wt %, preferably in the range from 2 wt % to ≤30 wt %, more preferably in the range from ≥5 wt % to ≤20 wt %. It has been found that in a range from ≥5 wt % to ≤20 wt % of carbon, with increasing carbon content, the density and crystallinity and also the specific surface area showed an advantageous combination, especially in the range from ≥12 wt % to ≤20 wt % of carbon. The carbon-coated particles preferably have a BET surface area in the range from ≥1 $m^2/g$ to ≤200 $m^2/g$, more preferably in the range from ≥50 $m^2/g$ to ≤150 $m^2/g$, very preferably in the range from ≥70 $m^2/g$ to ≤130 $m^2/g$.

Advantageously there is no substantial increase in the average diameter of the transition metal-doped zinc oxide particles as a result of the carbonizing procedure. Hence the carbon-coated, transition metal-doped zinc oxide particles can have a number based median value d50, measured by static image analysis, of the diameter in the range from ≥15 nm to ≤250 nm, preferably in the range from ≥20 nm to ≤80 nm, more preferably in the range from ≥25 nm to ≤50 nm. In the present case, the median value d50 of the diameter corresponds to the (number based) average value. A method for producing such particles is described, for example, in WO 2014/023680 A1.

In a preferred embodiment, the battery is encapsulated so that air can penetrate the gas diffusion layer. Preferably, the encapsulation has holes on the side facing the cathode which are large and numerous enough to allow air to pass in sufficient quantity.

In a second aspect of the invention, a method for producing the lithium-air battery according to the first aspect is provided, which includes: stacking on top of one another under inert gas of: a cathode including a gas diffusion layer having a solid electronically conductive material coated with carbon black, the gas diffusion layer being at least partially filled with gaseous air; a separator including an electronically nonconducting filter material, the filter material being at least partially impregnated with a liquid electrolyte, and an anode including a material selected from the group consisting lithium metal, material alloyable with lithium, metal oxide, and mixtures thereof. The separator is arranged between the anode and the cathode. The electrolyte includes N, N-diethyl-N-methyl-N-(2-methoxyethyl) ammonium bis (trifluoromethanesulfonyl) imide (DEME-TFSI) as the hydrophobic, ionic liquid and lithium bis (trifluoromethanesulfonyl) imide (LiTFSI) as the lithium salt. The three phases of gaseous air, liquid electrolyte and solid, electronically conductive material are in contact at, at least, one point of the gas diffusion layer. The method includes encapsulating the lithium-air-battery in such a way that air can penetrate into the gas diffusion layer.

In a third aspect of the invention, a lithium air battery is provided for use in a motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A-1D show (A) Arrhenius plot of the LiTFSI/DEME-TFSI electrolyte with, in inset, viscosity trend versus temperature (B) Current vs potential plot of the LSV and of the CV performed on a Li/LiTFSI/DEME-TFSI/Super-C65 cell using a scan rate of 0.1 mV $S^{-1}$ at various temperatures: 30° C., 40° C., 60° C. (C) Time evolution of the interface resistance of symmetrical Li/LiTFSI/DEME-TFSI/Li at various temperatures: 30° C., 40° C., 60° C. (D) Time evolution of the cell voltage during stripping deposition measurements performed on a symmetrical Li/LiTFSI/DEME-TFSI/Li cell using a current of 0.1 mA $cm^{-2}$ and a deposition-stripping time of 1 hour at various temperatures: 30° C. (FIG. 1D-2), 40° C. (FIG. 1D-3), 60° C. (FIG. 1D-4).

FIG. 2(A) Voltage profile marked by circles indicating the state of charge corresponding to the ex-situ XRD and SEM analyses of the pristine (FIG. 2B, 2E), fully charged (FIG. 2C, 2F) and fully discharged (FIG. 2D, 2G) electrode, respectively.

(FIG. 4A), 40° C. (FIG. 4B), 60° C. (FIG. 4C). Current 100 mA $g^{-1}$, capacity limited to 1500 mAh $g^{-1}$. SEM images of the electrode collected from the cell discharged limiting the capacity to 1500 mAh $g^{-1}$ at a temperature of 30° C. (FIG. 4D), 40° C. (FIG. 4E), 60° C. (FIG. 4F).

DETAILED DESCRIPTION OF THE DRAWINGS

Figure 1C:
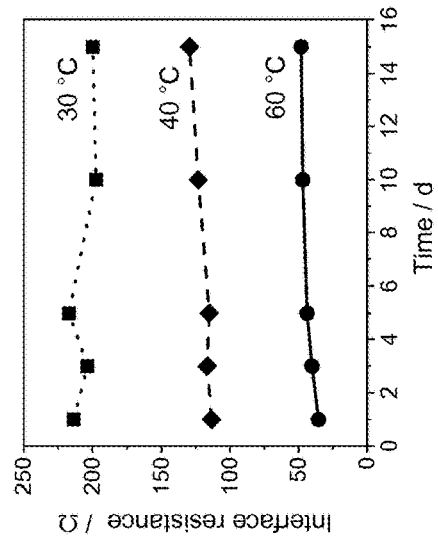
Figure 1B:
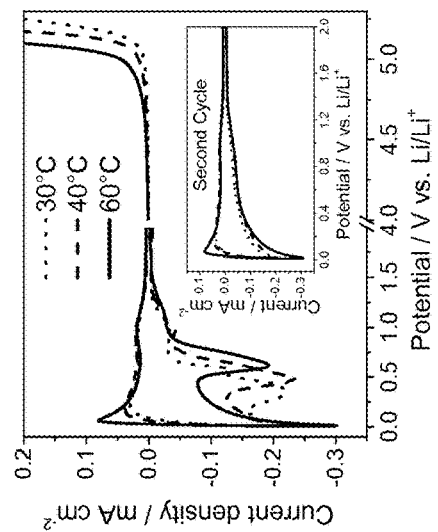
Figure 1A:
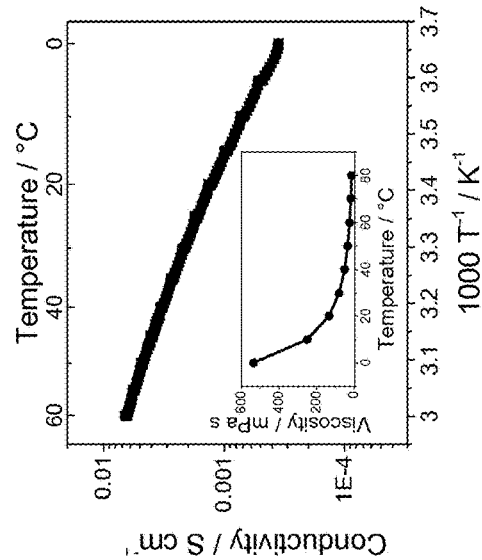
Figures 1, 1D:
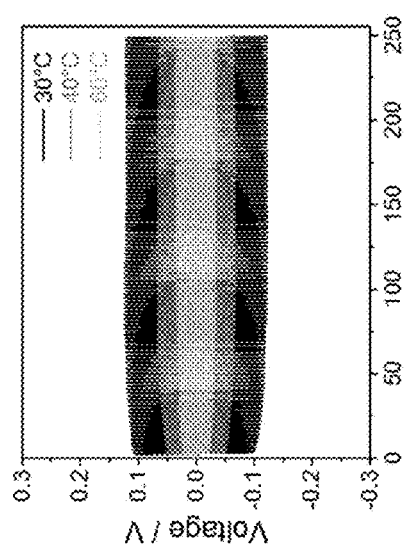

FIG. 1 reports the electrochemical characteristics of the LiTFSI/DEME-TFSI electrolyte. The Arrhenius plot of the LiTFSI/DEME-TFSI electrolyte shown in FIG. 1A, within 0° C.-60° C. temperature range, reveals a conductivity value of $3.5 \times 10^{-4}$ S $cm^{-1}$ at 0° C. that greatly improves by temperature to reach $2.2 \times 10^{-3}$ S $cm^{-1}$ at 30° C., $3.4 \times 10^{-3}$ S $cm^{-1}$ at 40° C. and $6.6 \times 10^{-3}$ S $cm^{-1}$ at 60° C., i.e., values considered well suitable for application in high performances lithium ion battery. The inset of FIG. 1A shows the viscosity of the LiTFSI/DEME-TFSI electrolyte within the same temperature range. The graph shows a relatively high value at 0° C. (above 500 mP s) that rapidly decreases by rising the temperature to 30° C. (80 mP s) and to 60° C. (24 mP s). The increase of the electrolyte conductivity, directly related to the decreased viscosity, is expected to greatly improve its electrochemical performance in lithium ion batteries. FIG. 1B reports the electrochemical window stability of the electrolyte at various temperatures, i.e., 30° C., 40° C., 60° C. The first cathodic scan reveals an irreversible broad peak associated to solid electrolyte interphase (SEI) film formation at the carbon surface, which limits further decomposition by following cycles (see 2nd cycle in inset of FIG. 1B). The irreversible peak associated to the SEI formation shifts to higher potential values by increasing the temperature, i.e., from 0.4 V at 30° C. to 0.5 V at 40° C. and to 0.6 V at 60° C. The higher temperatures may lead, in fact, to faster kinetics of the reductive formation of the SEI layer which takes consequently place at higher potential values. Following the first irreversible peak a second reversible peak appears at about 0.1 V vs Li/Li$^+$, as associated to the lithium uptake into amorphous carbon at the working electrode. The intensity of the peak ascribed to the lithium uptake in the amorphous carbon matrix increases by heating as mostly ascribed to the increased its electrochemical activity at higher temperature. The second cycle (inset of FIG. 1B) shows only the electrochemical lithium uptake into amorphous carbon without further decomposition processes, thus revealing the stability of the SEI film at the electrode surface. The corresponding anodic scans in FIG. 1B indicate a decrease of the oxidative degradation potential of the IL-electrolyte by heating expected by the enhancement of the decomposition reaction kinetics. Accordingly, the LiTFSI/DEME-TFSI electrolyte shows a stability extended up to 5.00 V vs Li/Li$^+$ at 30° C., decreasing to 4.87 V vs Li/Li$^+$ at 40° C. and finally to 4.68 V vs Li/Li$^+$ at 60° C. The stability of the lithium/electrolyte interface was investigated by monitoring the impedance evolution of symmetrical Li/LiTFSI/DEME-TFSI/Li cells at various temperatures. Non-linear least square (NLLSQ) analysis of the Nyquist impedance spectra has been performed, and the obtained time-evolution of the interface resistances at various temperatures reported in FIG. 1C. The figure evidences a quite stable trend at 30° C., 40° C. as well as at 60° C., with decreased value of the interface resistance by increasing temperatures, i.e., from 200Ω at 30° C., to 120Ω at 40° C. and finally to 40Ω at 60° C. This trend may be ascribed to the decrease of the resistivity of the SEI formed at the lithium metal surface by heating. Furthermore, the modest increase of the resistance at the higher temperatures, due to expected higher reactivity of the electrolyte with lithium metal, well suggests a stable lithium/electrolyte interface within the investigated temperature range. The ability of the electrolyte to sustain an efficient lithium dissolution/plating process was investigated by a stripping deposition measurement at various temperatures. FIG. 1D-1 to 1D-4 reports the voltage profile of the measurement performed at 0.1 mA cm$^{-2}$ at 30° C. (FIG. 1D-2), 40° C. (FIG. 1D-3), 60° C. (FIG. 1D-4). According to the above reported tests, the data reveal a decrease of the polarization associated to lithium dissolution/plating process by increasing the temperature, i.e., from a value of about 0.1 V at 30° C. to 0.05 V at 40° C. and finally to 0.025 V at 60° C. This trend can be associated to several factors, among them: i) increase of the ionic conductivity; ii) decrease of the electrolyte viscosity and iii) decrease of the interface resistance of the cell by heating. Furthermore, the measurement shows a stable polarization upon time, again suggesting a stable lithium/electrolyte interface.

Figures 1, 1D, 2:
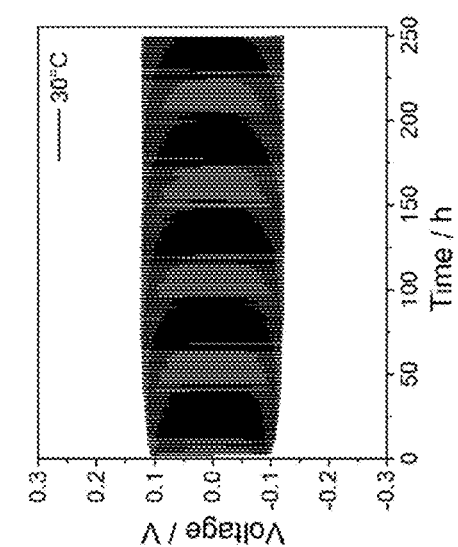
Figures 1, 1D, 2, 3:
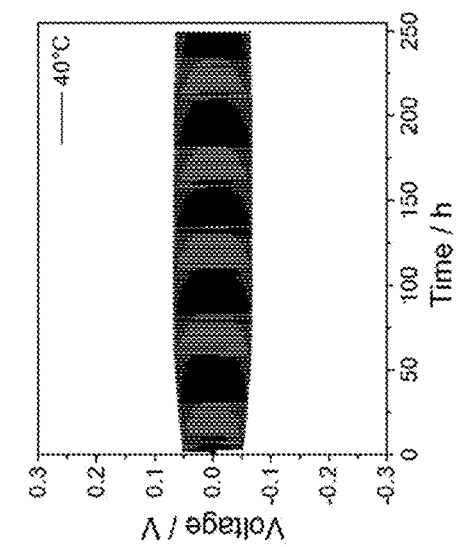
Figures 1, 1D, 2, 3, 4:
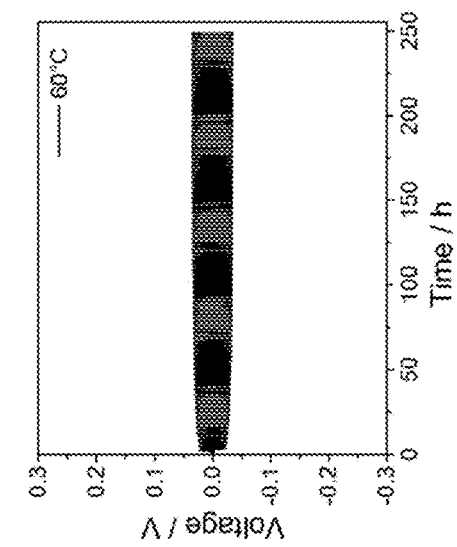
Figure 2A:
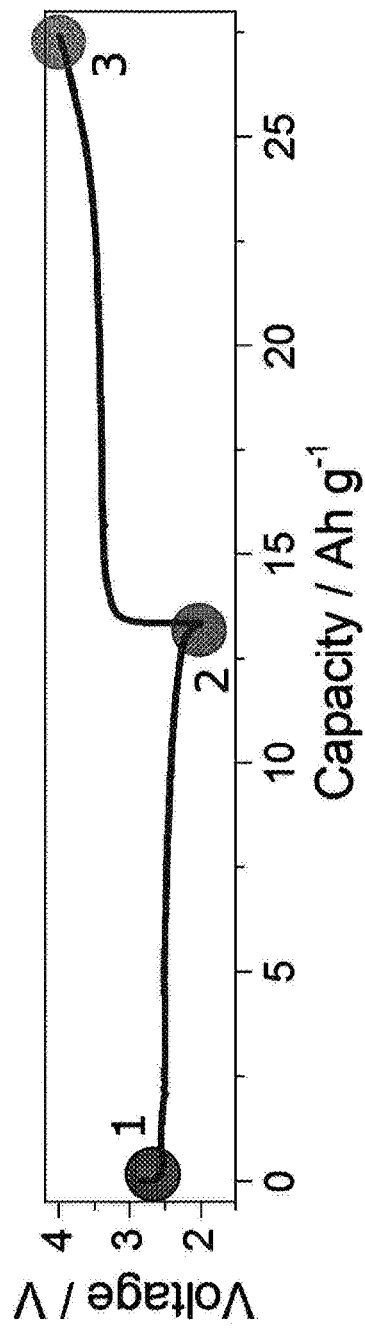
FIGS. 2A-2G relate to the structural and morphological characterization of the carbon based electrode collected from a Li/LiTFSI/DEME-TFSI/$O_2$ cell galvanostatically cycled within the 2-4 V voltage range at 100 mA $g^{-1}$.
Figure 2B:
Figure 2C:
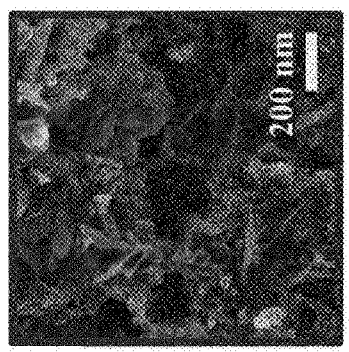
Figure 2D:
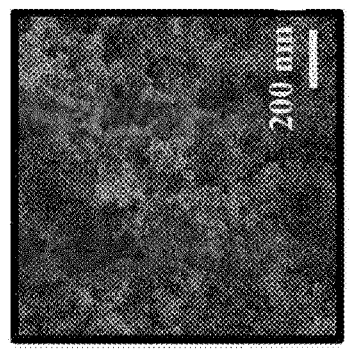
Figure 2E:
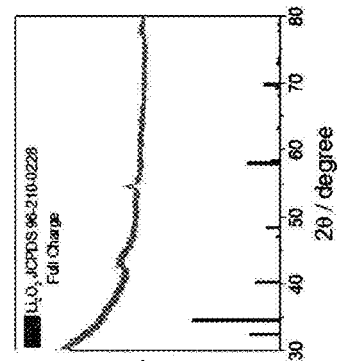
Figure 2F:
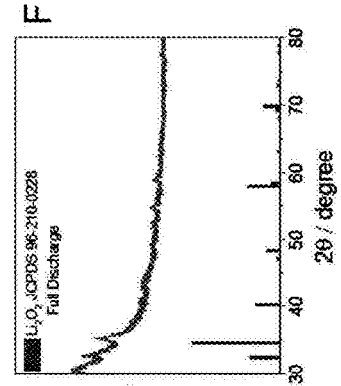
Figure 2G:
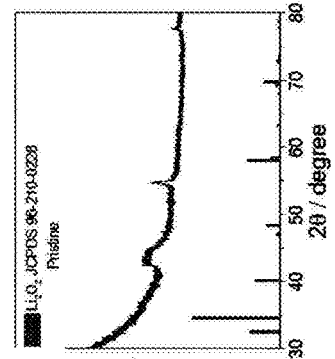

In FIG. 2, the LiTFSI/DEME-TFSI electrolyte is employed in a lithium oxygen cell according to the present invention, wherein lithium metal was used as anode. FIG. 2A reports the voltage signature of the cell cycled at 100 mA g$^{-1}$ within 2V and 4 V. The cell shows a flat discharge at about 2.5 V due to the electrochemical deposition of lithium peroxide at the carbon surface, and a delivered capacity of about 13 Ah g$^{-1}$. This very high capacity leads to a theoretical energy density of about 32.5 kWh kg$^{-1}$ that is a remarkable value, even considering several reduction factors accounting for the limited mass loading, inactive cell components and battery management system (BMS). The cell shows a good reversibility, and a Coulombic efficiency close to 100%. The reversibility of the electrochemical process is also suggested by the ex-situ XRD study and SEM images reported in FIG. 2. FIG. 2B shows the SEM micrograph of the pristine carbon electrode and evidences the typical morphology of the Super-C65 used as cathode material. Upon full discharge process (FIG. 2C) the SEM micrograph of the cathode reveals the formation of the lithium peroxide with a flat, disk-like shape. The SEM micrograph of the cathode upon full charge (FIG. 2D) shows the morphology associated to the pristine carbon, as indeed expected by the reversibility of the electrochemical process and the almost complete dissolution of the lithium peroxide formed during discharge. Further proof of the process reversibility is given by ex-situ XRD measurements performed after the (dis-)charge process at the carbon electrode (FIG. 2E-G). Indeed, the XRD pattern before cycling (FIG. 2E) evidences broad reflection peaks at 2θ value of 45 and 50 degree attributed to carbon-based electrode. Two new peaks at 32 and 35 degree associated to $Li_2O_2$ (indexed by JCPDS 96-210-0228) appear by full discharge (FIG. 2F) and almost completely disappear by following charge (FIG. 2G), thus suggesting a reversible deposition and subsequent dissolution of the lithium peroxide by the electrochemical process, in agreement with the results observed by SEM image (compare B-D and E-G in FIG. 2).

Figure 3B:
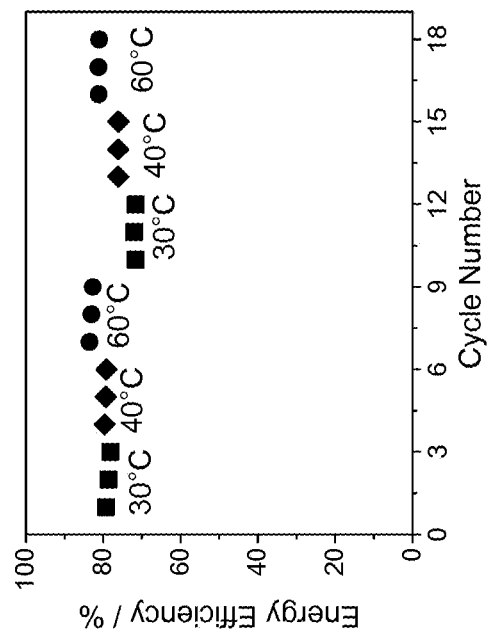
FIGS. 3A-3B relate to the voltage profile (A) and energy efficiency behavior during cycling (B) of the Li/LiTFSI/DEME-TFSI/$O_2$ cell cycled at various temperatures: 30° C., 40° C., 60° C. Current 50 mA $g^{-1}$. Capacity limited to 500 mAh $g^{-1}$.
Figure 3A:
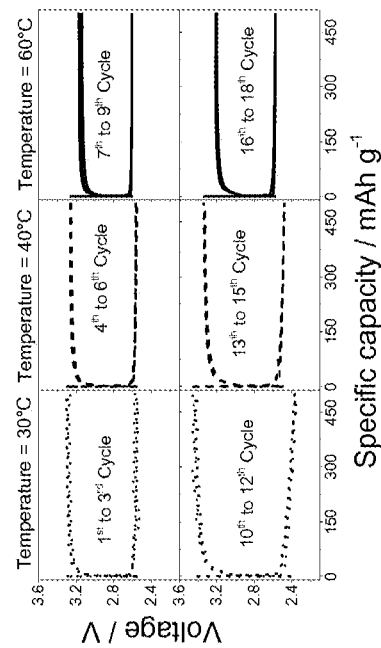
Figure 4A:
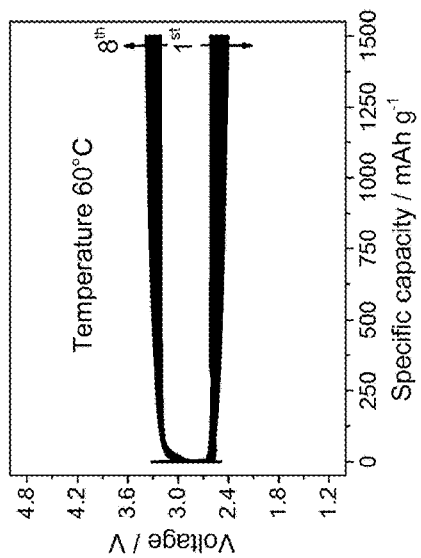
FIGS. 4A-4F relate to the voltage profile of the Li/LiTFSI/DEME-TFSI/$O_2$ cell cycled at various temperatures: 30° C.
Figure 4B:
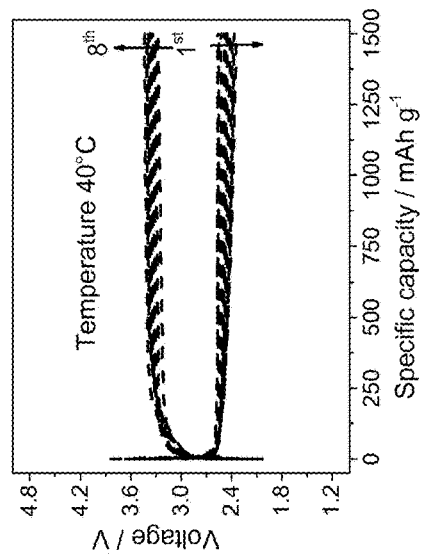
Figure 4C:
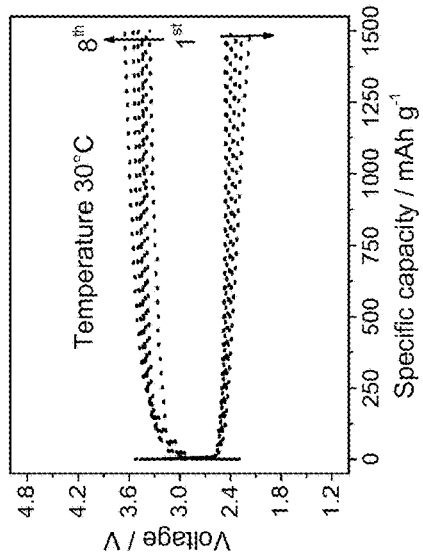

FIG. 3A shows the electrochemical performance of the Li/LiTFSI/DEME-TFSI/$O_2$ cell galvanostatically cycled by limiting the delivered capacity to 500 mAh g$^{-1}$ at various operating temperatures, i.e., 30° C. 40° C. and 60° C. The limited capacity condition used for cycling has been already proposed for lithium oxygen cell as the optimal condition for allowing a stable charge discharge operation. During the first stages at 30° C. (Top left of FIG. 3A) the cell is characterized by stable behavior and remarkable overlapping of the voltage profiles upon cycling, with a polarization between the (dis-) charge processes of about 0.6 V. Increasing the temperature during the following cycles results in a significant polarization decrease, i.e., down to 0.55 V at 40° C. (Top center of FIG. 3A) and to a value as low as 0.45 V at 60° C. (Top right of FIG. 3A). This behavior is expected by the combination of the increased ionic conductivity of the electrolyte, the lower value of the electrode/electrolyte interface resistance as well as by the improved kinetics of the electrochemical reaction at higher temperatures. Lowering back the temperature 30° C. (FIG. 3A bottom left curves) evidences an increase of the cell polarization in respect to the initial cycles (compare with FIG. 3A top left curve) as most likely due to possible side reactions at the higher operating temperatures. Likely, further increase of the temperature from 30° C. to 40° C. (Bottom center of FIG. 3A) and to 60° C. (Bottom right of FIG. 3A) leads to notably decreased cell polarization. Accordingly, FIG. 3B reports the evolution of the Li/LiTFSI/DEME-TFSI/$O_2$ energy efficiency upon cycles by increasing temperature and evidences the improvement of the cell energy efficiency by heating. Furthermore, the Figure indicates stable trend and only minor effects on the cell performance of the repeated heating/cooling. The Li/LiTFSI/DEME-TFSI/$O_2$ cell has been also investigated by increasing the delivered capacity limit up to 1500 mAh g$^{-1}$, which corresponds to a geometric surface capacity of about 2.4 mA cm$^{-2}$, at the various temperatures, i.e., 30° C. (FIG. 4A), 40° C. (FIG. 4B), 60° C. (FIG. 4C). Despite the higher capacity, the cell shows a stable cycling and reveals the already mentioned reduction of the cell polarization by increasing the temperature with consequent improvement of the energy efficiency. Remarkably, only limited increase of the cell polarization due to excess deposition of lithium peroxide or side reactions at the lithium side is observed by increasing the capacity limit from 500 to 1500 mAh g$^{-1}$.

Figure 4D:
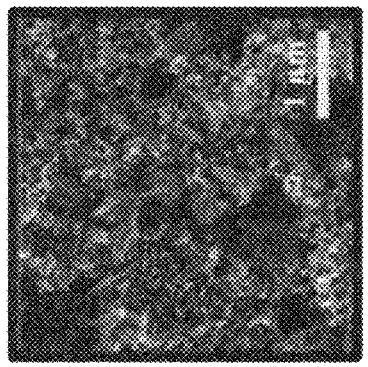
Figure 4E:
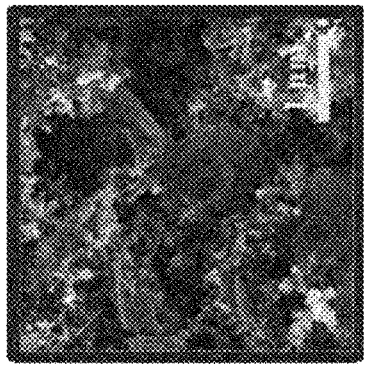
Figure 4F:
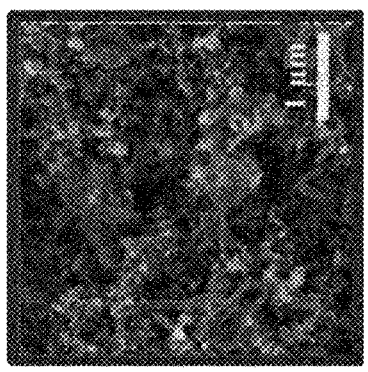

FIGS. 4D-F report the SEM micrographs of the carbon cathode upon discharge up to 1500 mAh g$^{-1}$ at the various operating temperatures (30° C., FIG. 4D, 40° C. FIG. 4E and 60° C. FIG. 4F). The images evidence an evolution of the discharge products micrometric morphology from flat-shape particles at 30° C. to toroidal, flower-shaped particles at 60° C. with intermediate morphology comprising both configurations at 40° C. The different morphologies of the discharge products may be ascribed to an electrochemical $Li_2O_2$ deposition process following two different pathways involving particles growth both at the electrode surface and into the electrolyte. This reaction mechanism is greatly influenced by the temperature and by the electrolyte ability to stabilize the intermediate superoxide species. In summary, the positive effect of the temperature increase on the cell energy efficiency may be ascribed to an improved kinetic of the electrochemical lithium peroxide deposition process, influencing both reaction pathway and morphology of the formed products.

Figure 5B:
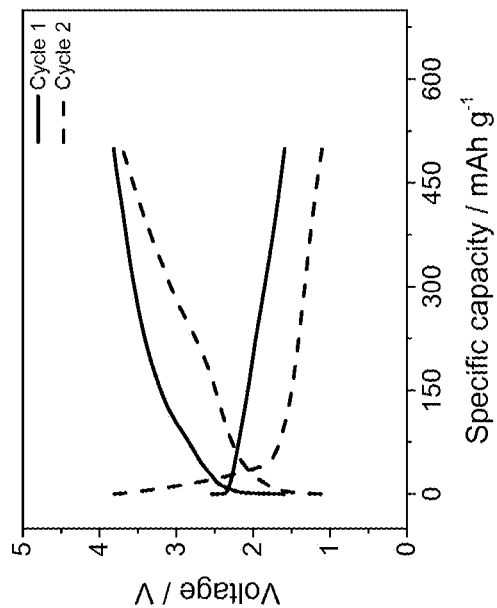
FIGS. 5A-5B show (A) Galvanostatic cycling profiles of Li/LiTFSI/DEME-TFSI/$Li_xFe_{0.1}Zn_{0.9}O$, Li/LiTFSI/DEME-TFSI/$O_2$ half-cells and $Li_xFe_{0.1}Zn_{0.9}O$/LiTFSI/DEME-TFSI/$O_2$ full-cell. Current 50 mA $g^{-1}$, capacity limited to 500 mAh $g^{-1}$ for all the Li/$O_2$ half-cell and full cell, cut off voltage for the Li/$Li_xFe_{0.1}Zn_{0.9}O$ half cell 0.01-3 V, and (B) two consecutive galvanostatic cycling profiles of Li/LiTFSI/DEME-TFSI/$Li_xFe_{0.1}Zn_{0.9}O$.
Figure 5A:
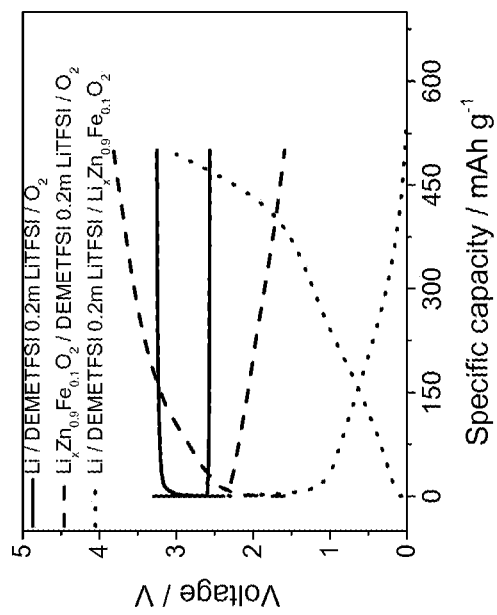

In FIG. 5A, the optional replacement of the lithium metal by a Li-ion, carbon coated $Fe_{0.1}Zn_{0.9}O$ (ZFO-C) conversion anode is demonstrated. FIG. 5A, reporting the voltage signature of the Li/LiTFSI/DEME-TFSI/$Li_xFe_{0.1}Zn_{0.9}O$ half-cell, evidences the expected sloping voltage profile associated to the reversible conversion/alloy reaction:

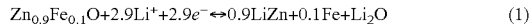

$$Zn_{0.9}Fe_{0.1}O + 2.9Li^+ + 2.9e^- \leftrightarrow 0.9LiZn + 0.1Fe + Li_2O \qquad (1)$$

The half-cell can deliver about 600 mAh g$^{-1}$, with a satisfactory Columbic efficiency, approaching the electrochemical performances in conventional carbonate based electrolyte. Before the full cell assembling, the anode has been electrochemically fully discharged down to 0.01 V and then coupled with the carbon based cathode in order to achieve a lithium ion oxygen cell. The $Li_xFe_{0.1}Zn_{0.9}O$/LiTFSI/DEME-TFSI/$O_2$ lithium-ion oxygen cell reported in FIG. 5A shows a (dis-) charge voltage profile reflecting the combination of the flat profiles associated to the Li/$O_2$ electrochemical process (black curve) and the sloping profile of the Li/LiFe$_{0.1}$Zn$_{0.9}$O electrochemical process illustrated by the electrochemical reaction (2):

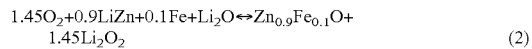

$$1.45O_2 + 0.9LiZn + 0.1Fe + Li_2O \leftrightarrow Zn_{0.9}Fe_{0.1}O + 1.45Li_2O_2 \qquad (2)$$

The cell has a discharge working voltage centered at about 1.8 V and delivers a reversible capacity of about 500 mAh g$^{-1}$.

In FIG. 5B, two consecutive galvanostatic cycle profiles of Li/LiTFSI/DEME-TFSI/$Li_xFe_{0.1}Zn_{0.9}O$ half-cell are shown. The half-cell demonstrates favorable characteristics with respect to cycling stability, specific capacity and loss of capacity.

Experimental

Electrolyte Preparation and Characterization

The electrolyte solution was prepared by dissolving 0.2 mol kg$^{-1}$ of lithium bis (trifluoromethane) sulfonimide (LiTFSI 3M, battery grade) in N, N-diethyl-N-(2-methoxyethyl)-N-methylammonium bis (trifluoromethanesulphonyl) imide (DEME-TFSI) ionic liquid (IL) in an argon filled glove box, with oxygen and water content lower than 1 ppm. The DEME-TFSI ionic liquid was synthesized from N, N-Diethylmethylamine (Sigma Aldrich) and 2-Bromoethyl methyl ether (Sigma Aldrich). After distillation, the two precursors were dissolved in tetrahydrofuran (THF) and kept under continuous stirring at 40° C. for one week. The following anion exchange was performed in ultrapure water, using LiTFSI as ionic exchanger in order to obtain the desired product. This was first rinsed with water several times, in order to remove bromide, and finally purified with activated charcoal and alumina using ethyl acetate as a solvent. The DEME-TFSI ionic liquid and the LiTFSI/DEME-TFSI electrolyte were dried under vacuum at 80° C. until the water content was reduced to less than 5 ppm (detection limit) as determined by Karl Fischer titration. The electrolyte conductivity Arrhenius plot was obtained by electrochemical impedance spectroscopy (EIS, Mmates-Biologic) using sealed Pt-black/Pt-black cells (Mmates) with a K value of 1 cm$^{-1}$ in a Julabo FP50 refrigerated/heating circulator for temperature control. The cell constant was confirmed using a standard 0.1 M KCl water solution (Fluka). The viscosity of the LiTFSI/DEME-TFSI electrolyte was evaluated at various temperatures in a dry room environment by means of Anton-Paar Physica MCR301 rheometer, applying constant shear rates, and using a liquid nitrogen based cooling unit and electrical-oven for heating. The lithium/electrolyte interface stability was evaluated by means of impedance spectroscopy of symmetrical Li/LiTFSI/DEME-TFSI/Li cells during storage time at various temperatures (30, 40, 60° C.). The impedance measurements were performed within frequency ranging from 200 kHz to 10 mHz by applying a 10 mV BIAS. The cycling stability of the lithium metal in the LiTFSI/DEME-TFSI electrolyte was evaluated by stripping/deposition measurements using symmetrical Li/LiTFSI/DEME-TFSI/Li cells, employing a current of 0.1 mA cm$^{-2}$ and a deposition-stripping time of 1 hour at various operative temperature (30, 40, 60° C.). The electrochemical anodic stability of the electrolyte was evaluated by linear sweep voltammetry with a scan rate of 0.1 mV s$^{-1}$, using a Super-C65 working electrode coated on aluminum foil. The cathodic stability was determined by cyclic voltammetry in a 0.01-2 V potential range at 0.1 mV s$^{-1}$ scan rate employing a Super-C65 working electrode coated on copper foil. The electrochemical window stability was evaluated at different temperature 30, 40, 60° C. All the electrochemical test was carried in thermostatic climatic chamber with a possible deviation of ±1° C.

Electrode Preparation and Electrochemical Characterization

The cathodes for the lithium oxygen cell cycle tests were prepared by doctor-blade technique, casting a slurry composed of C-NERGY Super-C65 (Imerys) and PVDF (6020 Solef, Solvay) in an 8:2 weight ratio, dispersed in N-methyl-2-pyrrolidinione (NMP, Aldrich 99.9%) on a gas diffusion layer (SGL-35BC carbon paper, SGL). After drying, the GDL-SP tape was punched in disk-shaped GDL-SP carbon electrodes having a diameter of 16 mm, the residual solvent was removed under vacuum at 110° C. overnight. The Super-C65 loading in the GDL-SP carbon electrodes ranged from 0.5 to 0.8 mg cm$^{-2}$. The electrochemical characterization was performed using a top-meshed 2032 coin-cell and lithium metal as anode, a sheet of Whatman glass fibre GF/A soaked by the electrolyte as separator and the GDL-SP electrode as cathode.

Cycling tests were carried out galvanostatically by limiting the capacity to 500 and 1500 mAh g$^{-1}$ (at 50 mA g$^{-1}$ and 100 mA g$^{-1}$ current, respectively) at various temperatures (30° C., 40° C., 60° C.) as well as by extending the test to a full voltage range, i.e., 2.0 V-4 V, using a current of 100 mA g$^{-1}$ at 30° C. temperature. All galvanostatic cycle tests were performed using a Maccor 4000 Battery Test System. The specific current and the specific capacity was referred to the Super-C65 carbon mass on the electrodes. All the electrochemical tests were carried in thermostatic climatic chamber with a possible deviation of ±1° C.

The morphological characterization was performed by ex situ, field emission scanning electron microscopy (SEM, Zeiss LEO1550VP Gemini) and X-Ray diffraction (XRD Bruker D8 Advance diffractometer equipped with a CuKα source l=0.154 nm). Prior to the SEM and XRD analyses, the studied electrodes were rinsed using dimethyl carbonate (DMC) in order to remove residual salt and/or ionic liquid.

The carbon coated $Fe_{0.1}Zn_{0.9}O$ (ZFO-C) was prepared using a procedure described in Bresser et al., Chem. Mater. 2013, 25, 4977-4985, a previous paper. The electrode was obtained by casting a slurry composed by 70% active material 20% of C-NERGY Super-C65 (Imerys) and 10% PVDF (6020 Solef, Solvay) dispersed in N-methyl-2-pyrrolidinione (NMP, Aldrich 99.9%) on a copper foil. After drying, the anode electrode tape was punched in disk-shaped electrodes having a diameter of 16 mm, the residual solvent was removed under vacuum at 110° C. overnight. The ZFO-C electrodes loading ranged from 2 to 3 mg cm$^{-2}$. The electrochemical characterization of the anode was performed using a 2032 coin-cell and lithium metal as anode, a sheet of Whatman glass fibre GF/A soaked by the electrolyte as separator, and the ZFO-C electrodes as cathode.

The full lithium ion oxygen cell was assembled using the fully lithiated ZFO—C as anode. The ZFO-C electrode was electrochemical prelitiated before assembling the lithium ion oxygen cell. The $Li_xZFO$-C/LiTFSI/DEME-TFSI/$O_2$ cell was galvanostatic cycled using a current of 50 mA g$^{-1}$ and limiting the delivered capacity to 500 mAh g$^{-1}$ at 40° C. temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lithium-air battery comprising:
    a cathode comprising a gas diffusion layer comprising a solid electronically conductive material coated with carbon black, wherein the gas diffusion layer being at least partially filled with gaseous air;
    a separator comprising an electronically nonconducting filter material arranged between the anode and the cathode, wherein the filter material being at least partially impregnated with a liquid electrolyte; and
    an anode comprising carbon-coated particles of $M_xZn_{1-x}O$, wherein M is a transition metal selected from the group consisting of Fe, Co, Ni, Mn and Cu, and $0.02 \leq x \leq 0.14$,
    wherein the liquid electrolyte comprises a hydrophobic, ionic liquid and a lithium salt,
    wherein the hydrophobic, ionic liquid is N, N-diethyl-N-methyl-N-(2-methoxyethyl) ammonium bis (trifluoromethanesulfonyl) imide (DEME-TFSI) and the lithium salt is lithium bis (trifluoromethansulfonyl) imide (LiTFSI),
    wherein three phases of gaseous air, liquid electrolyte and solid, electronically conductive material are in contact on at least one point of the gas diffusion layer, and
    wherein the battery comprises an encapsulation having holes on a side facing the cathode so that a sufficient quantity of gaseous air passes through to react with lithium ions for promoting an electrochemical reaction.

2. The lithium-air battery according to claim 1, wherein the gas diffusion layer comprises woven or nonwoven carbon fiber fabric.

3. The lithium-air battery according to claim 1, wherein the carbon black has a specific surface area of 30 to 120 g/m$^2$, as measured according to BET-nitrogen adsorption method.

4. The lithium-air battery according to claim 2, wherein the carbon black has a specific surface area of 30 to 120 g/m$^2$, as measured according to BET-nitrogen adsorption method.

5. The lithium-air battery according to claim 1, wherein the carbon black has a specific surface area of 40 to 90 g/m$^2$, as measured according to BET-nitrogen adsorption method.

6. The lithium-air battery according to claim 1, wherein the carbon black has a specific surface area of 50 to 80 g/m$^2$, as measured according to BET-nitrogen adsorption method.

7. The lithium-air battery according to claim 1, wherein the carbon black has a specific surface area of 55 to 70 g/m$^2$, as measured according to BET-nitrogen adsorption method.

8. The lithium-air battery according to claim 1, wherein the filter material comprises a material selected from the group consisting of glass fibers, cellulose fibers and organic polymer.

9. The lithium-air battery according to claim 2, wherein the filter material comprises a material selected from the group consisting of glass fibers, cellulose fibers and organic polymer.

10. The lithium-air battery according to claim 1, wherein the molar ratio of LiTFSI to DEME-TFSI is 1:2 to 1:20.

11. The lithium-air battery according to claim 2, wherein the molar ratio of LiTFSI to DEME-TFSI is 1:2 to 1:20.

12. The lithium-air battery according to claim 1, wherein M is selected from Fe and Co.

13. The lithium-air battery according to claim 1, wherein M is Fe.

14. A method for producing a lithium-air battery, comprising:
    stacking on top of one another under inert gas of:
    a cathode comprising a gas diffusion layer comprising a solid electronically conductive material coated with carbon black, wherein the gas diffusion layer being at least partially filled with gaseous air
    a separator comprising an electronically nonconducting filter material, wherein the filter material being at least partially impregnated with a liquid electrolyte, and
    an anode comprising carbon-coated particles of $M_xZn_{1-x}O$, wherein M is a transition metal selected from the group consisting of Fe, Co, Ni, Mn and Cu, and $0.02 \leq x \leq 0.14$,
    wherein the separator is arranged between the anode and the cathode, wherein the liquid electrolyte comprises a hydrophobic, ionic liquid and a lithium salt, wherein the hydrophobic, ionic liquid is N, N-diethyl-N-methyl-N-(2-methoxyethyl) ammonium bis (trifluoromethanesulfonyl) imide (DEME-TFSI) and the lithium salt is lithium bis (trifluoromethanesulfonyl) imide (LiTFSI), wherein the three phases of gaseous air, liquid electrolyte and solid, electronically conductive material are in contact on at least one point of the gas diffusion layer, and
    wherein the battery comprises an encapsulation having holes on the side facing the cathode.

* * * * *